INVENTOR.
Victor Stoll

Nov. 15, 1960

V. STOLL 2,959,857

DENTAL ANALYZER AND COORDINATOR

Filed Nov. 12, 1953

INVENTOR.
Victor Stoll
BY
ATTORNEY

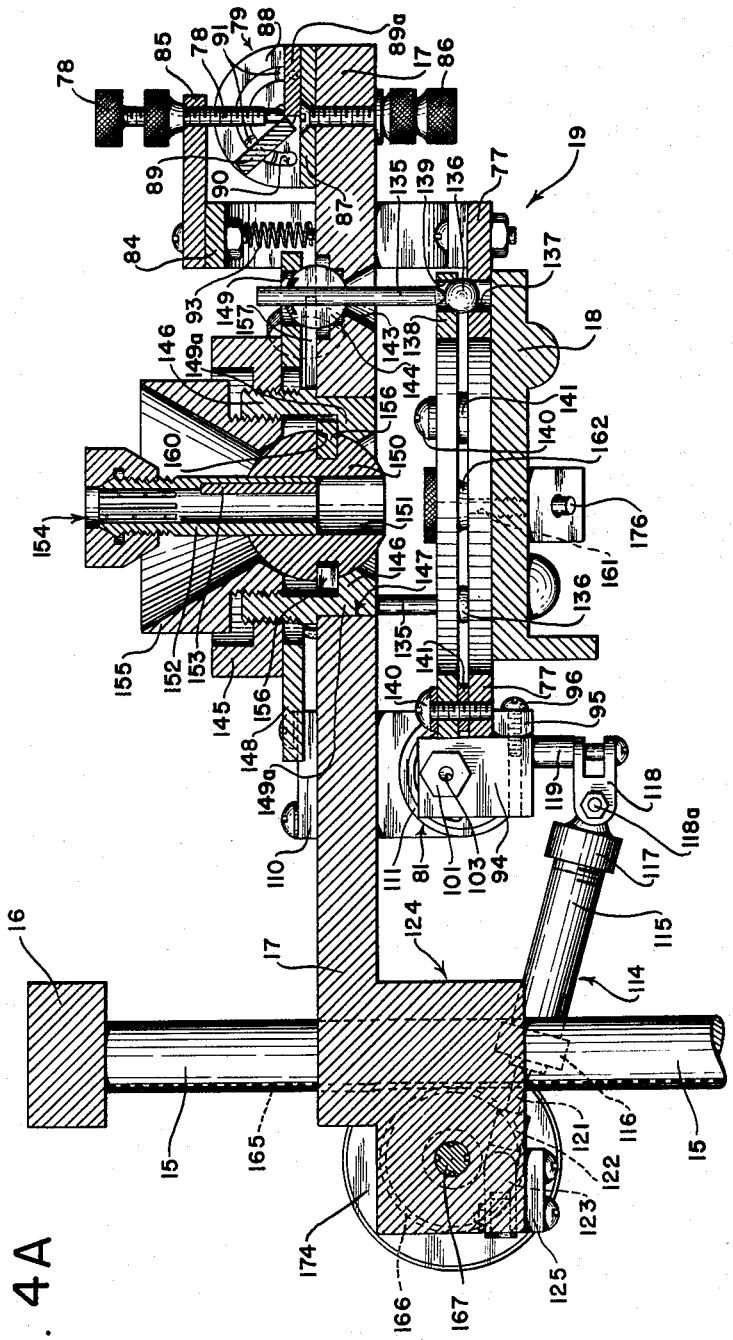

Nov. 15, 1960 V. STOLL 2,959,857
DENTAL ANALYZER AND COORDINATOR
Filed Nov. 12, 1953 10 Sheets-Sheet 5

INVENTOR.
Victor Stoll
BY
ATTORNEY

Nov. 15, 1960 V. STOLL 2,959,857
DENTAL ANALYZER AND COORDINATOR
Filed Nov. 12, 1953 10 Sheets-Sheet 6
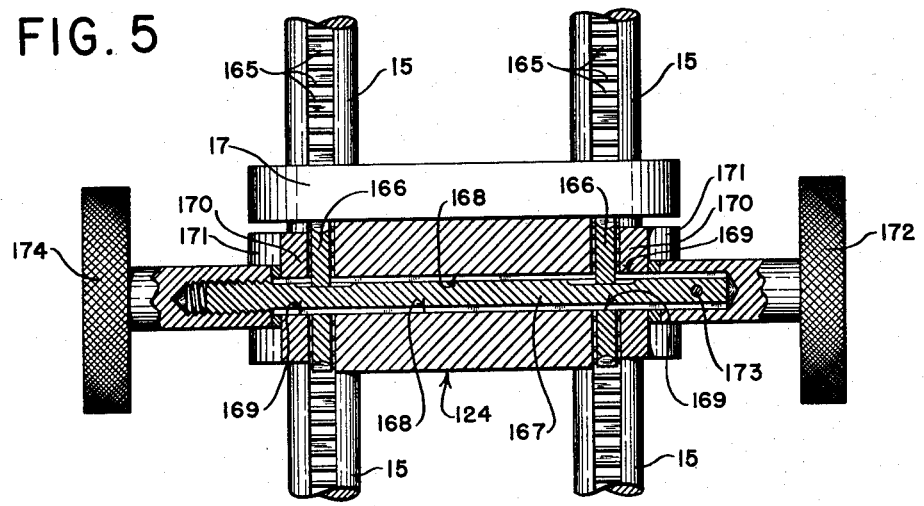
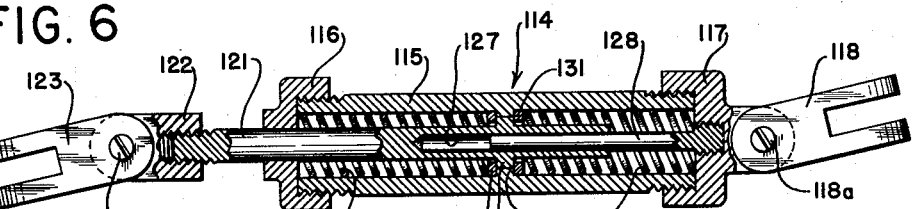
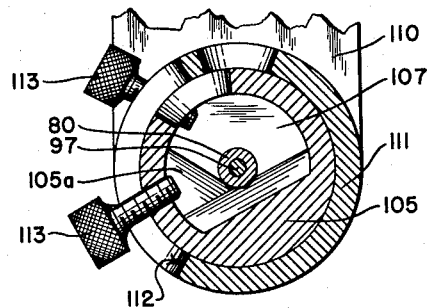
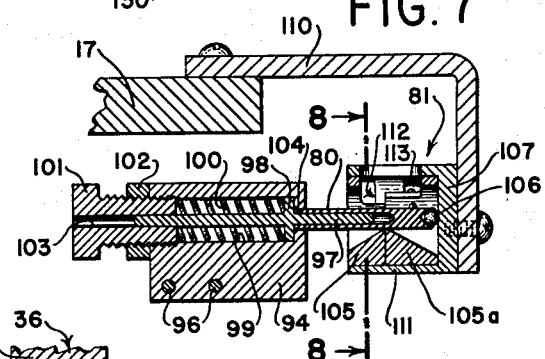
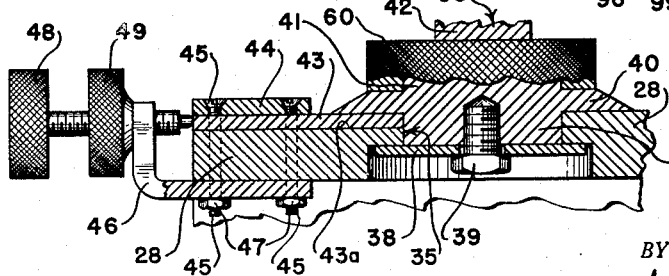
INVENTOR.
Victor Stoll
BY
ATTORNEY Nov. 15, 1960 V. STOLL 2,959,857
DENTAL ANALYZER AND COORDINATOR
Filed Nov. 12, 1953 10 Sheets-Sheet 7
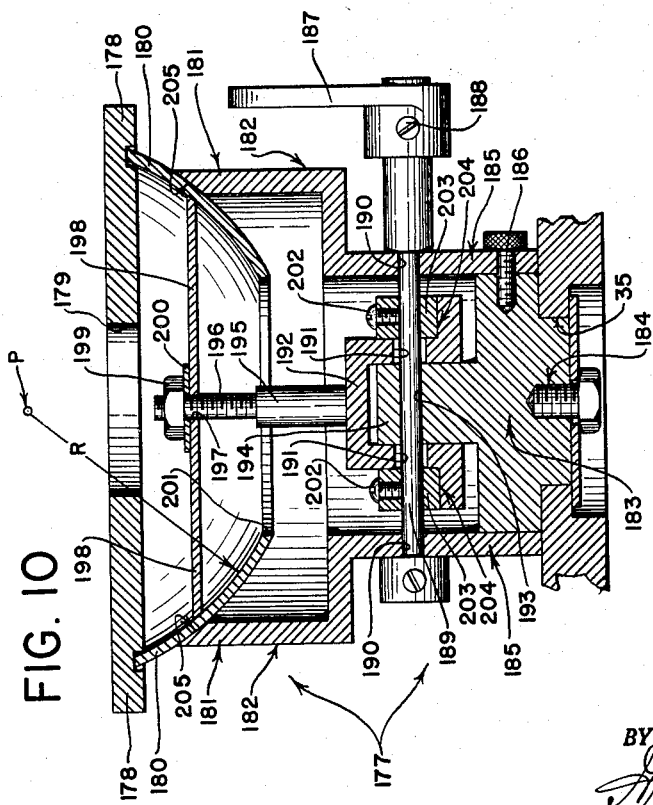
INVENTOR.
Victor Stoll
BY
ATTORNEY Nov. 15, 1960 — V. STOLL — 2,959,857
DENTAL ANALYZER AND COORDINATOR
Filed Nov. 12, 1953

INVENTOR.
Victor Stoll
ATTORNEY

Nov. 15, 1960   V. STOLL   2,959,857
DENTAL ANALYZER AND COORDINATOR
Filed Nov. 12, 1953   10 Sheets-Sheet 9

INVENTOR
Victor Stoll
BY
ATTORNEY

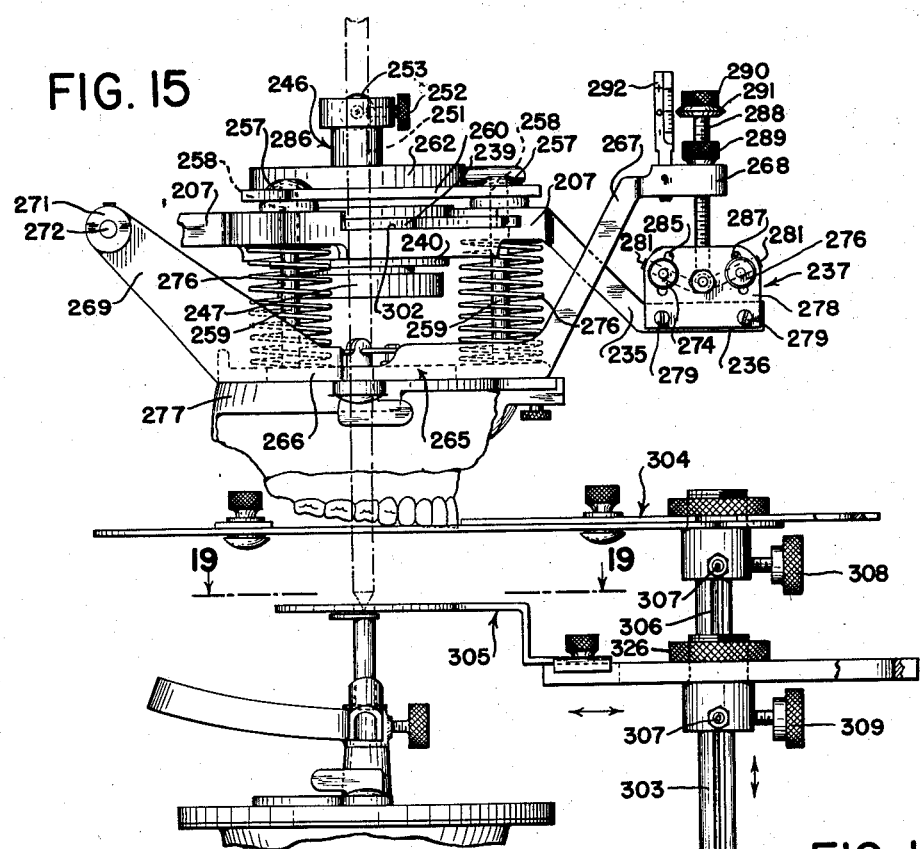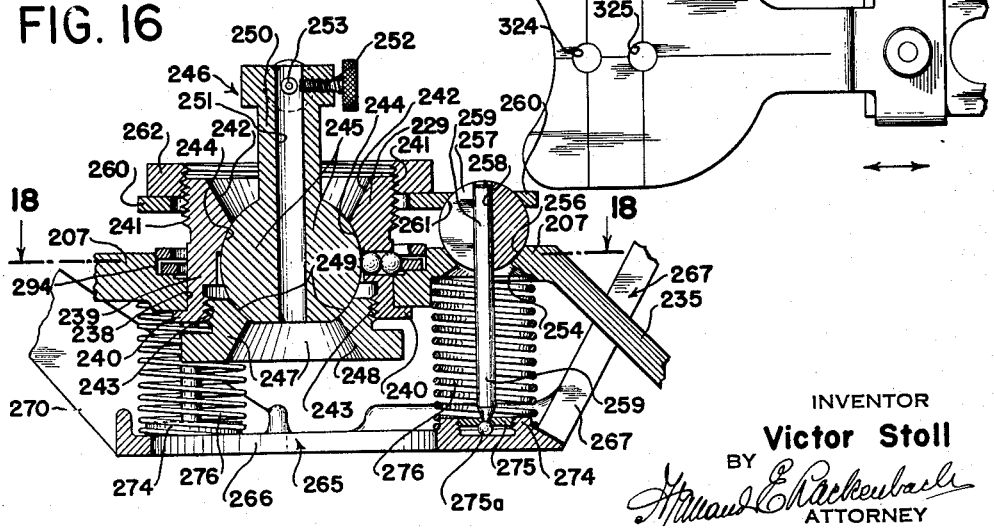

United States Patent Office 2,959,857
Patented Nov. 15, 1960

2,959,857
DENTAL ANALYZER AND COORDINATOR

Victor Stoll, 10—12 Nameoke Ave., Far Rockaway, N.Y.

Filed Nov. 12, 1953, Ser. No. 393,086

26 Claims. (Cl. 32—32)

The present invention relates to an apparatus affording a scientifically based and geometrically accurate means for surveying the dental mechanism of the human body for diagnosis, the study of the growth and development of human dentition, and for aid in analyzing, determining, and following through a procedure for the treatment of dental abnormalities. By utilization of my novel apparatus a complete analysis and survey of the human dentition and the dental mechanism may be made by the dental practitioner for the purpose of ascertaining actual deficiencies, and to determine corrective measures necessary to overcome the defects thus demonstrated and to aid in planning restoration, and reconstruction of an abnormal or irregular dental mechanism to achieve proper functioning thereof.

Thus, the general object of my invention is to provide an accurate apparatus for assisting the dental practitioner in determining the necessary corrective adjustments or restorative reconstruction to bring an abnormal dental mechanism into conformity with normal structure. By means of an apparatus embodying the present invention, a comparison between the actual architectural structure of the dental mass being analyzed is made with respect to a normal and substantially perfect dentition, so that the necessary reconstruction can be effected to overcome such defects as mal-articulation, mal-coordination of the jaws, malocclusion, and the reconstruction of broken-down and missing dental structures in restorative dentistry.

The basic principle of my analyzer and coordinator and its utilization are predicated upon the provisions of means for finding with accuracy the deviations from normal of a dental mass and to predict the results in re-establishing the normal. Accuracy in measuring and analyzing a dental structure can be attained only when a complete and fixed reference system is provided and the structure being analyzed is originally located in that reference system at a predetermined orientation, which, for the sake of convenience, usually is denominated as zero position. My instrument incorporates a complete reference system and means are provided to "zero" the dental structure being analyzed within this reference system.

Since the dental structure is a complex mass, the reference system must be complete and must permit accurate measurement of any malformation or abnormality. It is therefore an object of the present invention to provide an instrument capable of measuring and indicating all deviations from the normal by breaking such deviations down into their component parts and measuring universally deviations in the horizontal plane, in the vertical plane, circularly about a vertical axis, and angularly with respect to the horizontal plane.

By means of my apparatus, the differences in the architectural structure and the operation of the dental mechanism are clearly and definitely brought out by analysis, and then coordinated so that deviations from normal in structure and in operation are clearly and specifically demonstrated to the dental technician, thereby enabling him to ascertain what corrective measures should be taken to bring the dental mechanism surveyed and diagnosed into proper condition either by correction of the natural dentition by means of orthodontia or by mechanical restoration, and reconstruction.

Heretofore, all dental corrective and restorative problems have been attacked and solved in practice on a trial and error basis with the obvious result that much time and effort was wasted before the solution was found; and in some cases corrections were attempted which later proved futile, in that the structural change which was sought to be brought about was anatomically impossible for the particular patient. By means of my dental analyzer and coordinator, and its utilization, substantially all guesswork by the dental practitioner is eliminated; and there is brought into use a scientific and precise system necessary for the proper study, analysis, coordination and planning of reconstruction or restoration to eliminate structural defects or irregularities in the patient's dental mechanism.

In order to demonstrate more clearly the objects of my invention and the advantages thereof, the following brief résumé of the structurally ideal human dental mechanism is set forth. Said ideal mechanism is built up according to a definite geometrical plan.

Structurally, such ideal dental mechanism comprises two halves united together at the median plane of the head, each half being, of course, the symmetrical mirror image of the other. The arrangement of the teeth is defined by a spherical segment, as will be shown. The long axes of the teeth of both the upper and lower jaws are directed toward a common center lying within the median plane. The longitudinal series of grooves of the upper grinding teeth and the buccal cusps of the lower teeth normally occlude on a curved line every point of which is equidistant from said center. The longitudinal series of grooves of the lower grinding teeth, the lingual cusps of the lower grinding teeth, the buccal cusps of the upper teeth, and the lingual cusps of the upper grinding teeth each may be connected by a different curved line every point of which is equidistant from said center.

The lines described above may have different radii. The proper relationship of the dental arches is determined by the fitting of the upper mesial buccal cusp of the upper 1st molar into the buccal groove of the lower first molar and the upper canine falls between the lower canine and first bicuspid. The ridge line of the upper jaw is parallel to and above the ridge line of the lower jaw. When the upper and lower teeth are in contact with each other they are in centric or static occlusion.

The above described structures are inherent. However for purposes of anthropological measurement and orientation of the dental structure relative to the structures of the head and body, it is necessary to choose several planes.

A horizontal plane parallel to the plane of line of sight, when the head is substantially erect and sighted at the horizon, is selected. A transverse plane perpendicular to the horizontal plane, perpendicular to the median plane, and including the structural center is then derived or constructed. This transverse plane is found to cut through the molar region.

The intersection of the transverse plane and median plane is our vertical axis, which includes the structural center.

The structural arrangement of the human dental mechanism must be such that the complicated mechanical process of mastication can be performed smoothly and with ease by moving the lower teeth against the upper teeth. A definite natural form and structure are necessary for the proper performance of the physiological functions. When such definite form and structure has been destroyed, as by breakdown or removal of any portion or portions of the mechanism, proper performance of the complicated mechanical processes of mastication is impossible. When such structural arrangement of the human dental mechanism is no longer in balance, it should be brought by reconstruction or restoration to as near such balance as possible.

In order to re-effect such balance, a definite geometrical plan must be carried out and a set of geometrical tools for the survey and analysis of the dental mechanism is necessary to enable the practitioner to make a reconstruction for proper functioning.

The malformations and defect of the patient's dental mechanism are diagnosed by using the apparatus and method embodying the present invention in both static and dynamic relationships. Of course, any static irregularity will evidence itself in dynamic malfunctioning but since these irregularities can be analyzed while the jaw is at rest in the position of the patient's habitual centric position, it is more convenient to do it this way. Of course, any restoration or reconstruction determined on the static relationships must be checked to see if it is dynamically as well as anatomically proper for the individual patient.

In order to plan the reconstruction or restoration of the dental mechanism it is necessary first to determine what corrections have to be made. Since proper dental function is dependent upon proper dental structure malfunctioning of the patient's dental mechanism cannot be properly treated without an indication of structural faults. It is therefore an object of the present invention to provide an apparatus and method for the proper analysis of the dental structure to determine what corrections and restorations are desirable.

In accordance with my invention, and by utilization of my dental analyzer and coordinator, I provide the practitioner with an apparatus and method for accurately comparing the dental structure of the patient with the ideal and normal structural architecture to determine the variances therefrom and to indicate what measures of reformation and reconstruction are necessary to bring the maladjusted dental mechanism into its natural condition and thereby enable it to recover its natural mode of operation and function.

In its broadest aspects, my novel dental analyzer and coordinator comprises a plurality of interacting mechanical elements, so constructed and operatively mounted that the upper portion of the dental case and lower portion thereof are each separately mounted, whereby complete and universal relative movement may be had relative to one another. This movement is resolved into its component parts by the apparatus and the magnitude and direction of each component indicated by the mechanism. The apparatus also provides means for studying dynamic relationships by mechanical elements which are so constructed and operatively mounted that each dental cast may be freely and universally moved relative to the other cast and fixed in any position relative to each other. The dental practitioner may thus reproduce all possible movements of the human dental mechanism permitting him to study the functioning of the dental apparatus.

It will thus be seen that, through use of my apparatus and method, a skilled operator can readily and accurately correct natural dentures or produce artificial dentures of the highest precision for the accomplishment of the necessary functions when inserted in the human mouth, including not only proper mastication, but also for the formation and maintenance of correct facial contour, while at the same time providing proper muscle and nerve performance in harmony with the adjacent organs of speech and respiration.

These advantages, and features, and objects of the invention will be more fully understood from the following description and from the drawing:

Figure 1:
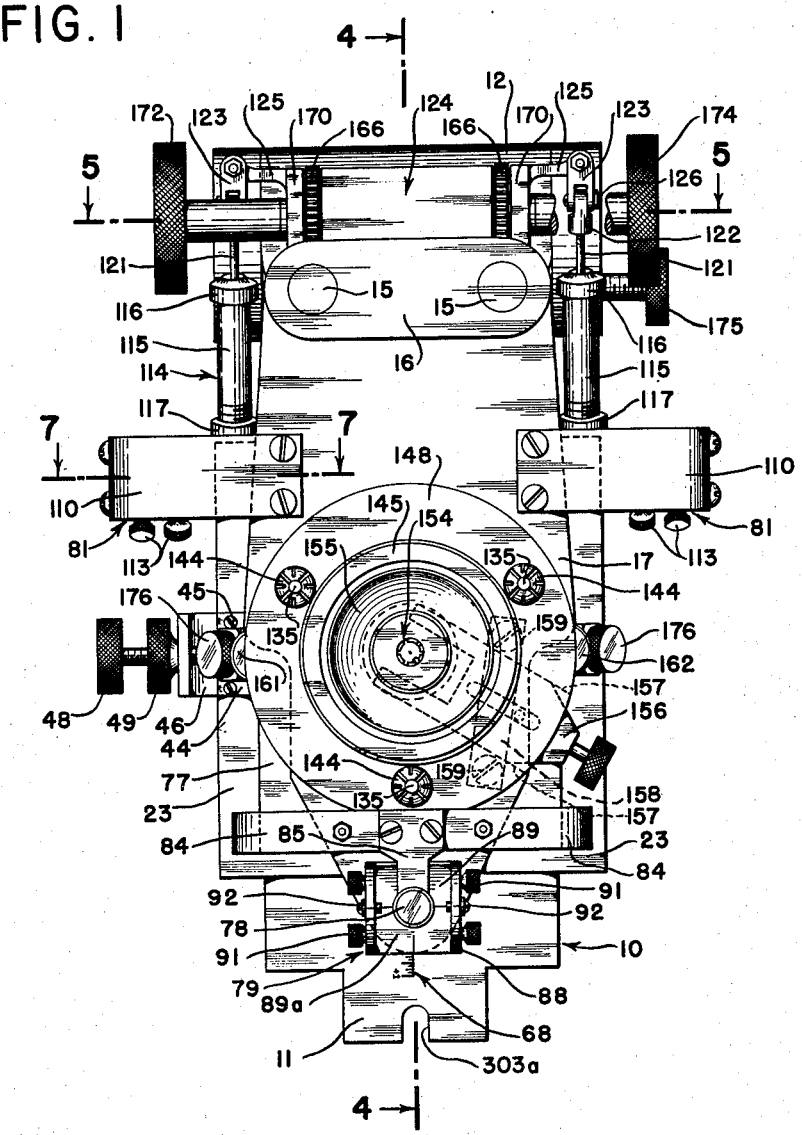
Fig. 1 is a plan view of a first form of invention.
Figure 4B:
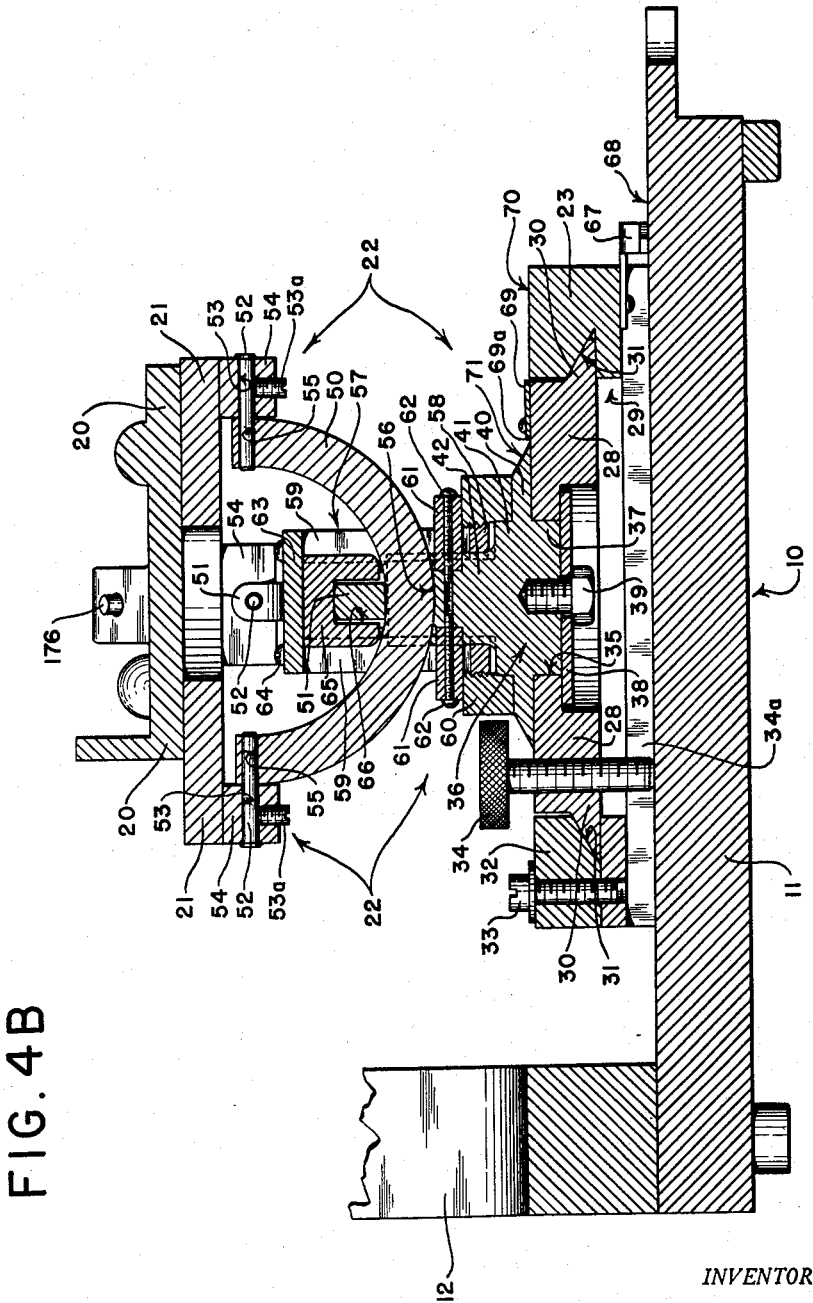

Figs. 4A and 4B, both of which are enlarged and of the same scale, together comprise a nearly complete right side elevational section of the apparatus taken on the median line 4—4 of Fig. 1.

Fig. 5 is the section 5—5 of Fig. 1.

Figure 3:
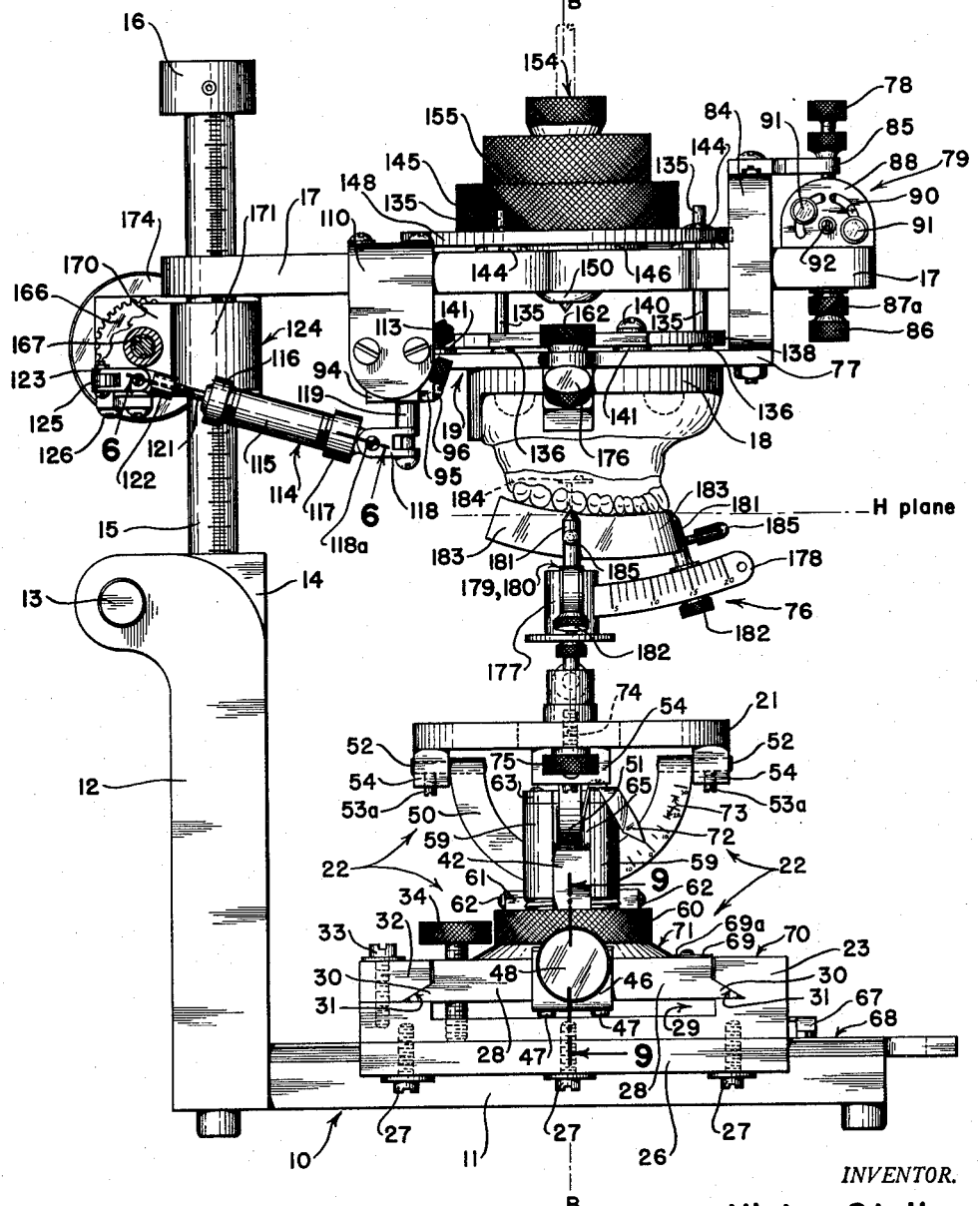
Fig. 3 is a right elevational view of this form.

Fig. 6 is the section 6—6 of Fig. 3.

Fig. 7 is the section 7—7 of Fig. 1.

Fig. 8 is the section 8—8 of Fig. 7.

Fig. 9 is the section 9—9 of Fig. 3.

Fig. 10 is a right elevational view in section on the median plane of the apparatus of a second form of the invention.

Figure 11:
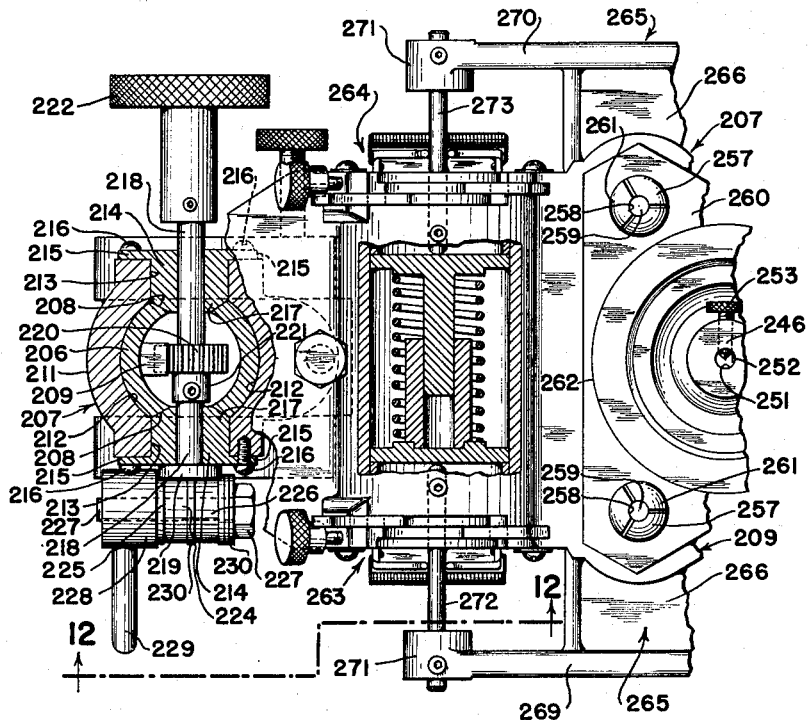

Fig. 11 is a partly sectional plan view of the rear portion of the upper part of said second form of the invention.

Figure 12:
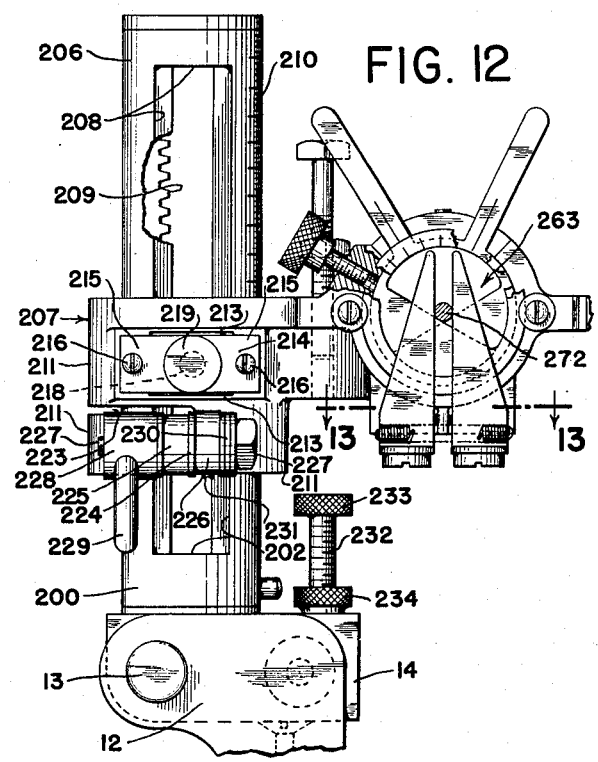

Fig. 12 is a right elevational view of the rear part of the upper portion of the second form of the invention.

Figure 13:
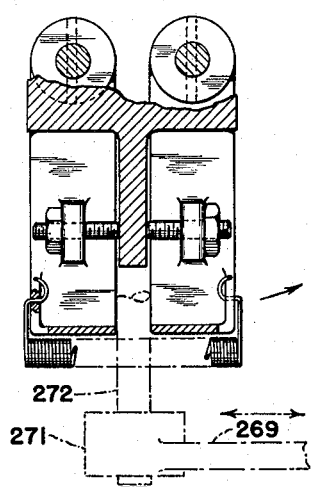

Fig. 13 is the section 13—13 of Fig. 12.

Figure 14:
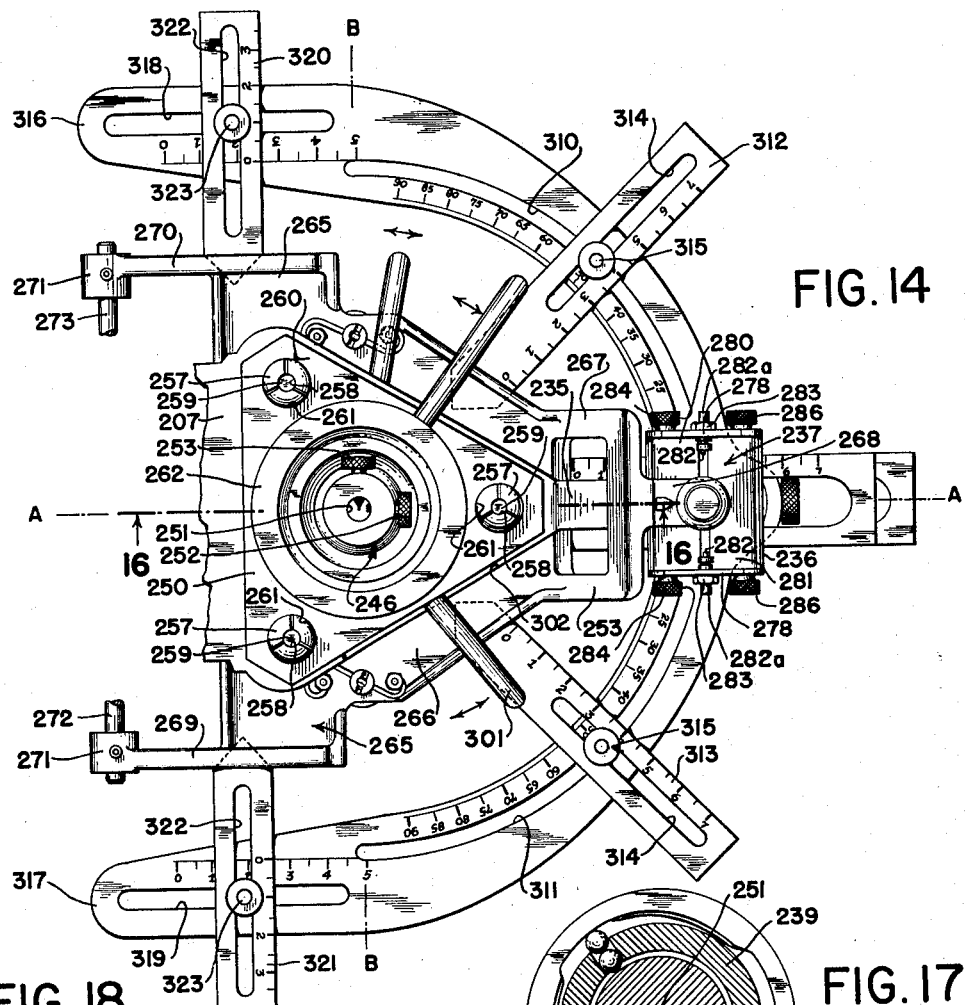

Fig. 14 is a plan view of the forward portion of the upper part of the second form of the invention.

Fig. 15 is a right elevational view of the forward portion of the upper part of the invention.

Fig. 16 is the section 16—16 of Fig. 14.

Figure 18:
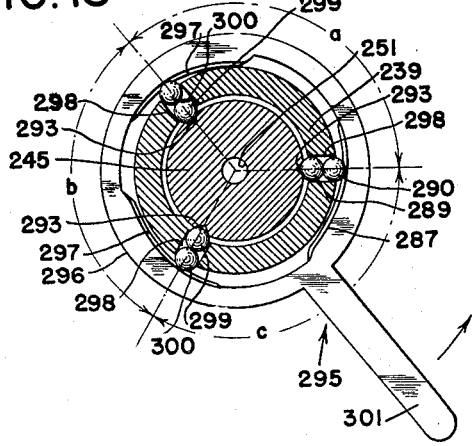
Figure 17:
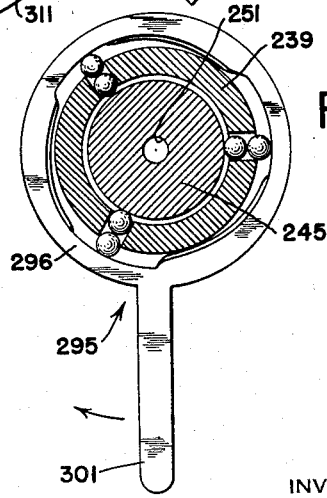

Figs. 17 and 18 are sections according to index 18—18 of Fig. 16.

Fig. 19 is the section 19—19 of Fig. 15.

Figure 2:
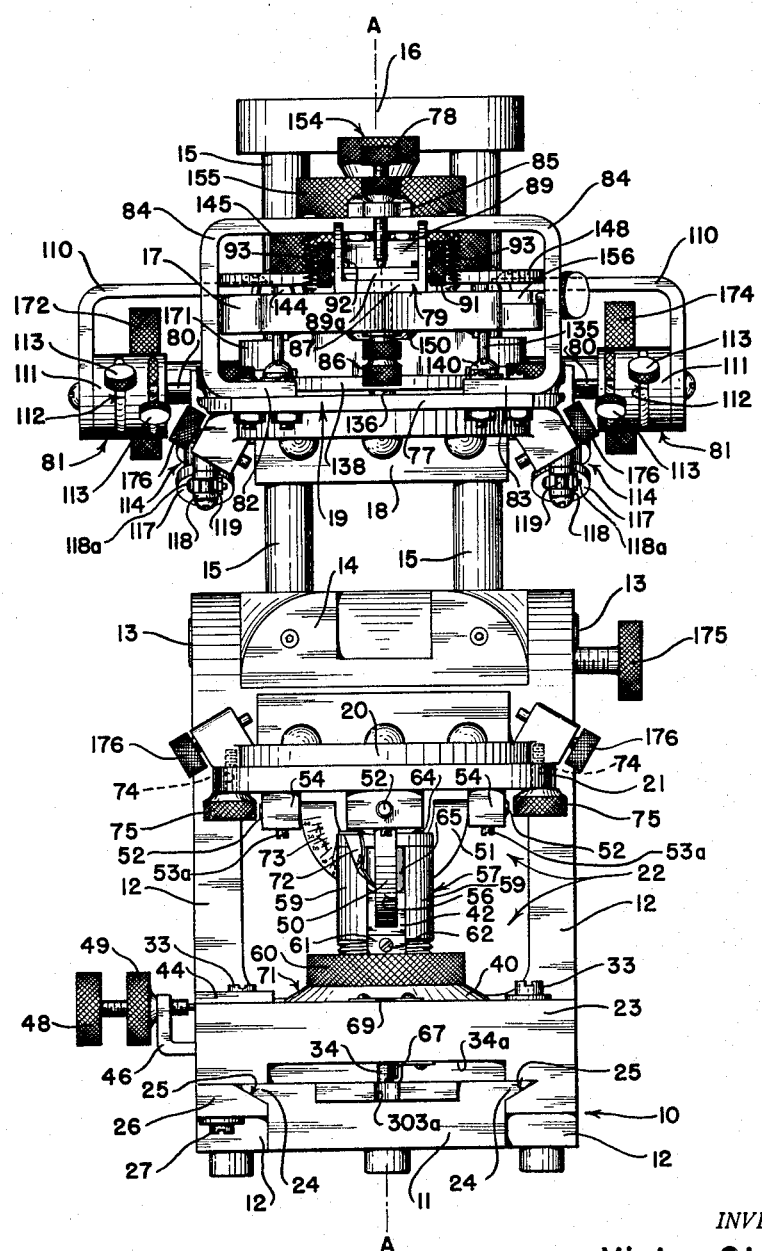
Fig. 2 is a front elevational view of this form.

The apparatus of the invention, built according to Figs. 1 through 9, or modified as illustrated in Figs. 10 through 19, comprises a rigid main frame which provides a bed and a standard rising from one end thereof, a lower assembly of parts movably mounted on the bed, and an upper assembly of parts movably mounted on the standard. The foregoing is best illustrated in Fig. 3, which is a right side elevation of the apparatus. Accordingly the front of the apparatus is to the right in Fig. 3, and it is seen that the standard rises from the rear end of the bed. The two assemblies of parts respectively provide means for mounting a replica of the lower dentition and a replica of the upper dentition of a case. The upper assembly of parts extends forwardly from the standard and over the lower assembly; and certain parts of each assembly may be universally moved, within limits, relatively to the other assembly. Fig. 1 is a plan of the apparatus wherein the front is at the bottom of the figure. Fig. 2 is a front elevation. The apparatus as an entirety is shown only in these three figures. The apparatus will operate even though the bed is tilted; but, as a convenience herein, the bed is invariably regarded as being horizontally disposed; and the vertical plane which includes the anteroposterior center line of the bed is referred to as the median plane of the apparatus, or as plane A. It will be shown subsequently that the plane A of the apparatus corresponds to the median plane of the human body. Plane A is that of the sectional views in Figs. 4a, 4b, 10, and 16; and is indicated in Figs. 1, 2, 5, 9, 11, 14, 17, and 18. The intersection of plane A and a transverse vertical plane B is referred to as the vertical axis, or simply as the axis, of the apparatus; and plane B is that of the sectional view of Fig. 9, and is indicated in Figs. 1, 3, 4a, 4b, 10, 11, 14, 15, 16, 17, and 18.

Planes A and B, and their intersection, the axis, form the basis of a geometric reference system to which the function of the apparatus relates. In the drawing all movable parts of the apparatus are generally shown in their normal or neutral positions. Some movable parts are urged to seek such positions, and, when moved therefrom and released, will automatically reassume these positions. Other movable parts are not so urged, and must be reset after having been moved away from such positions. Various scales are provided for indicating the relative positions of certain movable parts with respect to normality, and the readings of these scale provide the dentist with data helpful in surveying and analyzing a case and in planning and practicing prosthesis.

In the embodiment of the invention illustrated in Figs. 1 through 9 the apparatus is provided with a main frame 10 comprising a horizontal bed 11 and a standard 12, the latter being rigidly secured to the rear end of the bed and being bifurcated at its upper portion. Pivotally mounted at 13 on the top of standard 12 is a block 14, the block fitting between the forked extremities of the standard (Figs. 1 and 2). Rigidly mounted on block 14 are two like posts 15, these latter being rigidly connected together at their upper ends by a tie 16. While the structure comprising the block 14, the posts 15, and the tie 16, is, as a unit, pivotally mounted on the top of standard 12 at 13, the structure normally stands vertically, as best seen in Figs. 2 and 3.

Slidably mounted on posts 15 is a cantilever 17 which normally extends outwardly and horizontally over bed 11. A cast holder 18, on which a model of an upper set of teeth may be mounted with the biting edges of the teeth disposed downwardly, as shown in Fig. 3, may be suspended from cantilever 17 by means of an adjustable cradle structure designated 19 in its entirety. The cradle structure 19 is subsequently described in detail.

Another cast holder 20, on which a model of a lower set of teeth may be mounted with the biting edges of the teeth disposed upwardly, may be supported, as shown in Fig. 2, on a table 21, the latter being a member of another adjustable structure designated 22 in its entirety. The structure 22 is subsequently described in detail.

Broadly, a model of an upper set of teeth may be adjustably mounted on the upper assembly of parts of the apparatus, and a model of a lower set of teeth may be adjustably mounted on the lower assembly of parts, whereby the two models may be brought together to simulate natural occlusion of the dental structure represented by the models, and so facilitate a study of malocclusion, if any; and whereby, experimentally, remedial measures may be planned by variously adjusting the two models with respect to each other. As the entire upper assembly of parts of the apparatus is pivotally mounted on standard 12 at 13, and as the cantilever 17 may be moved vertically on posts 15, the model of an upper set of teeth may be raised and lowered with respect to a stationary model of a lower set so that artificial bite tests in wax or other material may be made with the occlusive relationship of the two sets at any of a variety of experimental vertical settings, whereby the operator may gain data to guide him in planning dental reconstruction.

The structure 22 is mounted on a carriage 23, the latter being slidably mounted on bed 11 for anteroposterior horizontal movement. The bed 11 is provided on its sides with V-shaped flanges or keys 24. The carriage 23 is provided with keyways 25 which are engaged by said flanges or keys. The righthand keyway 25, as seen in Fig. 2, is formed directly in the body of the carriage. The lefthand keyway 25 is made up by applying a beveled strip 26 to the lower portion of the carriage by screws 27 (Fig. 3). Thus the carriage may slide lengthwise with respect to the bed 11, the keys and keyways maintaining the carriage in proper alignment.

The base of adjustable structure 22 is a block 28, mounted within a transverse slot 29 provided at the top portion of carriage 23. Tranverse keys 30 on the front and rear sides of block 28 engage transverse keyways 31 provided in the walls of slot 29. The forward keyway 31 is formed in the body of the carriage, as shown in Fig. 3. The rearward keyway 31 is made up by applying a beveled strip 32 to the upper portion of block 28, the strip being secured to the block by means of screws 33 (see Fig. 2, particularly; also, Figs. 3 and 4b). Thus the block 28, and the structure mounted thereon, may slide transversely with respect to both the carriage 23 and the bed 11.

A screw 34, having an enlarged knurled head for easy manipulation, is threaded through block 28 and passed freely through a fenestration 34a in carriage 23 (see Figs. 2 and 4b), and may be driven to engage the upper surface of the bed 11. By driving the screw 34 firmly against the bed the carriage 23, block 28, and the superimposed structure may all be locked against horizontal movement. Thus the center of the structure 22 may be positioned as desired at any focus within an imaginary rectangle, and there locked.

As best shown in Figs. 4b and 9, the block 28 is provided with a central circular aperture 35. Rotatably mounted on block 28 is a member 36 having a boss 37 fitted within aperture 35. A disk 38 is secured to the bottom of boss 37 by means of a screw 39 whereby the member 36 is prevented from vertical disengagement from block 28. Above boss 37 is a peripherally beveled flange 40 which rests upon the upper surface of block 28 surrounding aperture 35 (Fig. 4b). The beveled surface of flange 40 is calibrated in degrees (see below). Above flange 40 of member 36 is another boss 41; and above boss 41 the cross section of member 36 is reduced to form a rectangular block 42 (Figs. 2, 3, 4b, and 9). As seen in Fig. 9, a member 43, slidably mounted in a slot 43a in the upper portion of block 28, and radially disposed with respect to aperture 35, is provided for locking member 36 against rotary movement by jamming boss 37 with aperture 35. Member 43 is maintained within its slot by means of a cover plate 44 which is secured to block 28 by screws 45. See Figs. 1, 2, 3, and 9. A bracket 46 is secured to the underside of block 28 by the same screws 45 and nuts 47. A screw 48, provided with an enlarged knurled head for easy manipulation, is driven through an upturned portion of bracket 46, as best shown in Fig. 9 (see, also, Figs. 1, 2, and 3), and engages the outer end of member 43. Screw 48 may therefore be utilized to force member 43 against boss 37 for the purpose of locking member 36 against rotation. A knurled jam nut 49 is provided for locking screw 48 in a desired position.

Table 21 is supported by a gimbal structure comprising two arcuate elements 50 and 51, disposed in planes intersecting at an angle. The element 50 is the larger of the two, and element 51 is positioned above element 50 and within the bow of the latter (see Figs. 2, 3, and 4b). Elements 50 and 51 are pivotally attached to table 21 by pins 52 which extends through bores 53 in lugs 54 provided on the under side of table 21, and through bores 55 provided near the extremities of the elements 50 and 51. Pins 52 are locked in bores 53 by means of set screws 53a. These pins, however, may rotate within bores 55 of elements 50 and 51.

The lower and larger element 50 is slidably mounted within a guide slot 56 in rectangular block 42 of member 36 (Fig. 2; also Figs. 3 and 4b). Guide slot 56 is provided with a partly cylindrical bottom to mate with the convex surface of the arcuate element 50, as shown only in Fig. 4b.

Mounted on the top of boss 41 of member 36 is a support 57, generally of cylindrical shape. See Figs. 2, 3, and 4b. The support 57 is provided with two diametrical slots, each of which extend from the top of the support nearly to the bottom thereof, said slots being at right angles to each other. The lower portion of the support is further slotted upwardly from the bottom to accommodate rectangular block 42 of member 36. Thus the cylindrical surface of the support 57 is interrupted at four angular positions, spaced at 90°, except at the extreme lower portion of the support (Fig. 4b). Portion 58 is externally threaded. The cruciform slotting of the upper portion of the support provides four posts 59. An externally knurled and internally threaded annulus 60 is mounted on flange 40 of member 36. The external threads of the lower portion 58 of support 57 engage the internal threads of annulus 60, as shown only in Fig. 4b. Blocks 61, secured to rectangular block 42 of member 36 by screws 62, prevent vertical movement of the annulus 60.

The upper ends of posts 59 of support 57 are rigidly tied together by a disk 63 which is secured to each of the posts by one of four cap screws 64. A guide member 65 is provided within and between the four posts 59, and is located adjacent to, and beneath, disk 63. The guide member is provided with a slot 66 within which arcuate element 51 of the gimbal structure is slidably mounted, the upper surface of the slot 66 being shaped to conform to the concave surface of the element. The guide member 65 is free to rotate with respect to posts 59 on an axis which is also the vertical center line of support 57.

The annulus 60 is provided as a means for raising and lowering support 57. When support 57 is sufficiently lowered guide member 65 operates to clamp arcuate elements 50 and 51 against block 42 of member 36, whereby the gimbal structure may be locked with the plane of table 21 disposed as desired. The blocks 61 and the flange 40 prevent vertical movement of annulus 60. Therefore, in response to rotation of annulus 60, support 57 necessarily compensates therefor by moving vertically.

Indicators mounted on disk 63 and calibrations on arcuate elements 50 and 51 are provided whereby a determination of the disposition of the plane of table 21 may be made. See Figs. 2 and 3. When the reading of the calibrations of elements 50 and 51 is zero, as shown in the figures mentioned immediately above, the plane of the table is horizontal, and therefore parallel to bed 11 and cantilever 17. If cast holder 20, for supporting a model of a lower set of teeth, is mounted on table 21 with the table in the position shown in Figs. 2 and 3, the median plane of the apparatus dissects the cast holder.

A pointer 67 is secured to carriage 23 (Figs. 2, 3, and 4b); and as the carriage is moved lengthwise with respect to the bed 11 the pointer tracks along a suitable scale provided on the top of the bed, and shown in Fig. 1, indicating the anteroposterior relationship of the normal vertical axis of structure 22 with respect to the axis of the apparatus. In Fig. 3 the two axes coincide. Another pointer 69 is secured to block 28 (Figs 2, 3, and 4b); and as the block is moved transversely with respect to the carriage 23 and bed 11 this pointer tracks along a suitable scale 70 provided on top of the carriage, indicating the transverse relationship of the normal vertical axis of structure 22 with respect to the axis of the apparatus. In Figs. 1 and 2 the two axes also coincide. Therefore, in Figs. 1, 2, and 3, structure 22 is at zero, or normal, position; and, as will be subsequently shown, this structure is in the position it initially occupies when a model of a lower set of teeth is affixed to cast holder 20 preparatory to operation of the apparatus in the planning of dental prosthesis. Scale 70 is not shown, because it would appear only in a plan view; and in the general plan view of Fig. 1 the scale is obscured; but the surface of carriage 23 on which scale 70 is scribed is indicated by arrows in Figs. 3 and 4b. When pointers 67 and 69 both indicate zero, cast holder 20 is registered with cast holder 18, provided the latter is also in normal or neutral position. (It will be shown subsequently that cast holder 18 is urged to seek a normal position.)

The pointer 69 is provided with a diametrically opposed indicating portion 69a (Figs. 3 and 4b) which cooperates with a circumferential scale 71 (indicated only by arrow) marked upon the beveled portion of flange 40. The relationship of portion 69a to scale 71 is an indication of the angular disposition of structure 22. Pointers 72 mounted on top of disk 63, each pointer being secured by one of the cap screws 64, serve to indicate the angular dispositions of arcuate elements 50 and 51 which support table 21 and comprise part of the gimbal structure. Elements 50 and 51 are each calibrated in degrees, both scales being designated 73. See Figs. 2 and 3.

Table 21 is provided with bores 74 to accommodate screws 75 for securing the cast holder 20 to the top of the table (Fig. 2), or for securing to the top of the table a surveying device, a part of which is shown in Fig. 3. Such device is discussed in detail subsequently in the specification.

The cradle structure 19, by means of which the cast holder 18 for supporting a model of an upper set of teeth is connected to cantilever 17, is best illustrated in Figs. 2, 3, and 4a. The cradle structure 19 permits universal tilting of cast holder 18, and means are also provided for locking the cast holder 18 with its plane in any desired position.

The cradle structure 19 comprises a plate 77 to the under side of which an element such as cast holder 18 may be conveniently attached. The plate 77 is supported at three points. In front the plate is provided with a screw 78, the lower end of which rests in a front cuspal guide 79, and on the sides by pins 80 which rest in rear cuspal guides 81. See Figs. 2, 7, and 8. The extremities 82 and 83 of a yoke 84 are secured to the plate 77 by suitable screws and nuts, as best shown in Fig. 2; and the screw 78 is threaded into a forward extending bracket 85 secured to the upper portion of yoke 84 (Figs. 1, 2, and 3). The front cuspal guide 79 is secured to cantilever 17 by a screw 86 which passes through base 87 of guide 79, the screw being provided with a jam nut 87a. Sidewalls 88 of guide 79 extend upwardly from cantilever 17; and cuspal guide plates 89 and 89a are pivotally mounted within the cuspal guide 79 as best shown in Figs. 3 and 4a. The sidewalls 88 are both provided with arcuate slots 90. Passed through these slots are cap screws 91, each of which is threaded into the side of one of the cuspal guide plates 89 and 89a. When tightened these cap screws serve to lock the plates in the angular positions desired. See Fig. 3. Pins 92 are passed through the sidewalls 88 and extend a short distance into the cuspal guide 79. See Fig. 1. The corners of each cuspal guide plate 89 and 89a are pivotally mounted on pins 92. Compare Figs. 1, 2, 3, and 4a.

Springs 93 (Fig. 2; only one seen in Fig. 4a), connecting the under side of the top portion of the yoke 84 with the top of the cantilever 17, urges the structure 19 downwardly, whereby the lower end of screw 78 is brought against one or both of the cuspal guide plates 89 and 89a. See Fig. 4a.

Pins 80 are mounted in blocks 94 (Figs. 4a and 7) which are secured to depending lugs 95 provided at the rear corners of plate 77 by means of screws 96. Pins 80, which are axially bored from one end nearly to the other, are mounted, as sleeves, on the ends of other pins 97, one of which is shown almost exclusively in axial section in Fig. 7. Each pin 97 is provided intermediate its ends with a flange 98; and each pin 97 passes freely through a stepped bore 99 in a block 94. The outer portion of each bore 99 is reduced so that a pin 80, with an end of a pin 97 inside, may pass therethrough; but this portion of the bore is too small to permit passage of a flange 98, which is urged against the step of the bore by a compression spring 100. The open end of the larger section of each stepped bore 99, as seen in Fig. 7, is threaded; and a screw 101 is driven into each bore 99 as an abutment for said spring. A jam nut 102 is provided for locking each screw 101 in desired position. An axial bore 103 passes from end to end of screws 101, and the inner ends of pins 97 are received partly therein, the arrangement serving to maintain alignment of said pins.

The outer portions of the pins 80 rest upon edges of cuspal guide plates 105 and 105a of the rear cuspal guides 81. Compare Figs. 7 and 8. The outer end of each pin 80 is countersunk, as shown in Fig. 7, and a ball bearing 106 is captivated within the countersink; and the ball is pressed against the outer wall 107 of a cuspal guide 81, because the pin 80 is urged outwardly by a spring 100.

The rear guides are located on the sides of the upper assembly of parts of the apparatus, and are suspended from cantilever 17 by means of oppositely disposed brackets 110. See Figs. 1, 2, 3, 4a, 7 and 8. Each rear cuspal guide is a hollow cylinder having a normally horizontal axis and a walled outer end (wall 107, see above). The two guides 81, as best shown in Fig. 2, are coaxial. The cylindrical walls of the guide 81 are designated 111. These walls are provided with parallel circumferential slots 112, and through each slot 112 there is freely passed a cap screw 113 which is threaded into one of the cuspal guide plates 105 or 105a of the related guide 81. By tightening these screws the guide plates may be locked in desired angular position, the plates, of course, being normally rotatable within the hollow cylinder comprising a guide 81. Each guide plate (105 or 105a) is provided with a bevel so that the pin 80 may rest upon a knife edge. See Figs. 7 and 8.

The structure associated with pins 80 is also adapted to provide resilient opposition to movement of cast holder 18 and its supporting plate 77 transversely in the horizontal plane and for automatically bringing the cast holder and supporting plate back to a normal or neutral position after these members have been offset transversely.

Centering devices 114, best seen in Figs. 3 and 6, provide resilient opposition to movement away from a particular position of plate 77 longitudinally with respect to cantilever 17. Such position is the normal position of plate 77. Said devices tend automatically to return the plate 77 to its normal position after displacement therefrom. As the devices 114 are inclined they also serve to return the plate 77 to such normal position after the plate has been displaced vertically.

The devices 114 comprise cylinders 115 having end caps 116 and 117 threaded thereon. The lower end caps 117 are pivotally connected to links 118 by means of pins 118a for articulation in a plane normal to plate 77. The links 118 are pivotally connected to plate 77 for articulation in a plane parallel to said plate by means of a member 119. The structure involving end caps 117, links 118, pins 118a, and members 119, constitute universal joints. Members 119 are rigidly mounted on the underside of plate 77. A piston 121, more particularly described below, is mounted within each cylinder 115. Elements 122, mounted on the upper ends of pistons 121, are pivotally connected to links 123 for articulation in a vertical plane; the links 123 are pivotally connected to the base 124 of cantilever 17 by means of brackets 125 (Fig. 4a) whereby articulation here may be had in a horizontal plane. An element 122 is connected to a link 123 by a pin 126. Thus the structure involving elements 122, links 123, pins 126, and brackets 125, also constitute universal joints.

One of the two assemblies comprising a device 114 is shown, much enlarged, and mainly in axial section, in Fig. 6. The piston 121 is provided with an axial bore 127 extending from one end (the right hand end in Fig. 6) to a considerable depth. A rigid rod 128, coaxial with piston 121, is mounted on the inside of end cover 117 and extends slidably into bore 127. The rod 128 serves to maintain alignment of piston 121 within cylinder 115. In the center of the inside of cylinder 115 is a centripetally disposed flange 129. Integral with piston 121 is a centrifugally disposed flange 130. Normally, i.e., when the piston 121 is in the position shown in Fig. 6, the two flanges 129 and 130 are registered with each other. Washers 131 are mounted on the piston 121 on either side of both flanges, as shown. Surrounding piston 121 within cylinder 115 between end cap 116 and the washer 131 nearest thereto is a compression spring 132; similarly, the piston is surrounded by a like compression spring 133 which bears against end cap 117 and the washer 131 nearest thereto. The springs 132 and 133 normally maintain the piston 121 in the position shown in Fig. 6. If, by movement of piston 121, the flange 130 is forced out of registry with flange 129, one spring—132 or 133, as the case may be—tends to return the piston to normal position.

The plate 77 is connected to cantilever 17 by three rods 135. These rods are employed in locking the plate 77 in a desired position with respect to cantilever 17. Rods 135 are here angularly spaced at 120°. Each rod is provided at its lower end with a ball 136 rigidly mounted thereon. Each ball 136 is seated rotatably partly within one of three angularly spaced circular apertures 137 provided in plate 77. Positioned above, and slightly removed from, plate 77 is a flat annulus 138, provided with three angularly spaced apertures 139 registered with apertures 137. The annulus 138 is connected to plate 77 by screws 140 and maintained at a slight distance therefrom by spacers 141. This structure is best illustrated in Fig. 4a, wherein it is seen that a ball 136 is confined by an aperture 137 of plate 77 and the corresponding aperture 139 of annulus 138, parts of the ball being within each aperture. The registered apertures provide a socket within which the ball may move universally.

The upper ends of the rods 135 pass through apertures 143 in cantilever 17. Apertures 143 are angularly spaced at 120° intervals, like apertures 137 and 139, and each aperture 143 is normally registered with an aperture 139 of annulus 138 and an aperture 137 of plate 77. The lower portion of an aperture 143 is of conical shape, the cross section increasing toward the mouth of the aperture on the under side of cantilever 17. The upper part of the aperture 143 comprises a stepped counterbore, shown in Fig. 4a. Slidably mounted on the upper portion of each rod 135 is a slotted ball 144 which operates as a collet. Balls 144 are seated within the smallest or bottommost counterbore of aperture 143, and may rotate universally. Angular changes in the relationship between a rod 135 and cantilever 17 are freely accommodated by the conical section of an aperture 143.

Balls 144 are not normally secured to rods 135, the balls being slotted so that, unless they are clamped to the rods by pressure tending to close the slots, the rods may move relatively to the balls. To accomplish the clamping of the balls to the rods a nut 145 is provided, this nut being threaded onto the exterior of a cylinder 146 force fitted into a circular aperture 147 provided in cantilever 17, the axis of aperture 147 being both the center of the angular spacing of apertures 143 and the axis of the apparatus. A flat annulus 148, having angular spaced apertures 149, corresponding to apertures 143, is mounted on the upper parts of the balls 144 with the upper parts of these slotted balls partly within the apertures 149. When the nut 145 is tightened, the nut drives the annulus 148 downward, the edges of the apertures 149 operating as means for reducing the openings of the slots of balls 144 and thereby clamping the balls upon their related rods 135.

Cylinder 146 is hollow. The cylinder is axially counterbored from the top downwardly nearly to the bottom whereby an internal flange 149a is provided within the lower part of the cylinder. Seated within the cylinder 146 against the internal flange 149a is a ball 150 having a diametric bore 151. Force fitted within the bore of the ball 150 is a tube 152 which is provided internally with a key 153 and a chuck 154 adapted to hold an instrument having a cylindrical shank, such as a pointer, subsequently to be described. The upper portion of the counterbore of cylinder 146 is threaded, and a jam nut 155 is mounted therein. The jam nut may be tightened to prevent movement of ball 150. To insure accurate locking of the ball 150 within bore 151 in vertical position, a locking fork 156 is provided (see Fig. 1). The locking fork is slidably mounted within a groove 157 in cantilever 17 and held in place by a cover 158 secured to the cantilever by screws 159. See Figs. 1 and 4a. The locking fork, when moved into engagement with slots 160 in ball 150 securely hold the latter in vertical position within the bore 151.

Plate 77 is provided with bores 161 (only one of which is indicated in the drawing, and that in dotted lines in Fig. 4a) similar to bores 74 in table 21 whereby screws 162 (Fig. 1) may secure the cast holder 18 to the plate 77.

It has been earlier shown that cantilever 17 is mounted for vertical movement on posts 15. Posts 15 are provided with racks 165, as shown in Fig. 5. Pinions 166 splined on shaft 167 engage racks 165. Shaft 167 is free to rotate within the bore 168 provided in the butt portion or base 124 of cantilever 17, and passes through apertures 169 in ears 170 of lugs 171 of base 124. A knurled knob 172 is mounted on one end of shaft 167 and keyed thereto by a pin 173 (see the righthand side of Fig. 5). Rotation of knob 172 effects vertical movement of cantilever 17. Another knurled knob 174 is threaded onto the other end of shaft 167 and is used to lock the cantilever 17 against vertical movement. Driving knob 174 so that it approaches knob 172 operates to draw the ears 170 toward each other, thereby clamping the posts 15 within the base 124 of cantilever 17.

Block 14, previously described as being pivotally mounted at 13 on the top of standard 12, may be locked against movement relative to standard 12 by means of a set screw 175 (Figs. 1 and 2).

The cast holders 18 and 20 are alike and interchangeable. It will be seen in Fig. 2 that each cast holder is provided with a pair of oppositely disposed set screws 176, each pair of set screws being adapted to secure a dental cast to its related holder. Cast holders 18 and 20 may be readily removed from the apparatus.

Figs. 10 through 19 illustrate a modification of the apparatus. This modification may serve as a substitute for most of the lower assembly of parts, including the structure 22, and for the entire upper assembly of parts. Due to the enlarged scale of Figs. 10 through 19 the modification, as a whole, is not shown in any single figure or even on any single sheet of the drawing. That portion of the modification which provides a substitute for certain elements of the lower assembly of parts is shown only in Fig. 10. This figure is a right side elevational view, in section, the plane of the section being the median plane of the apparatus, or plane A. Fig. 10 accordingly corresponds to Fig. 4b. That portion of the modification which provides a substitute for the upper assembly of parts is shown in Figs. 11 through 19. In this portion of the modification a single column, best seen in Fig. 12, is employed in place of the two posts 15 described above, and the column is rigidly mounted on block 14 or an equivalent thereof. Mounted on the single column for vertical movement is a cantilever which is functionally equivalent to cantilever 17. The single column appears in Figs. 11 and 12 only. No figure shows the substitute cantilever in its entirety. However, this cantilever is completely illustrated in plan by the combination comprising Figs. 11 and 14, and in right side elevation by the combination comprising Figs. 12 and 15. Figs. 11 and 12 both show approximately the rear half of the substitute cantilever and its relationship to the single column substituted for posts 15; and Figs. 14 and 15 both show the rest of this cantilever. This cantilever also appears in Fig. 16, the section 16—16 of Fig. 14. The plane of the sectional view of Fig. 16 is plane A. Figs. 10 through 19 generally omit parts of the apparatus shown in other figures; but, for reference, block 14 and the upper portion of standard 12 appear in Fig. 12, and a fragment of the upper portion of the structure illustrated in Fig. 10 appears in Fig. 15. This latter figure best shows the general relationship between the substitute lower and upper parts of the apparatus.

That part of the modification shown in Fig. 10 illustrates a substitute for the universal positioning mechanism or structure 22, previously described. The equivalent structure, in Fig. 10, is generally designated 177. The structure 177 is a means for supporting and for universally positioning a replica of the lower dentition of a case. However, means for effecting transverse and longitudinal movements of the replica are not shown in Fig. 10 as such means would be but duplicates of means already described and illustrated in Figs. 2, 3, and 4b. Fig. 10 illustrates a structure for accomplishing rotational movement about a vertical axis and universal tilting of a table 178, which is functionally equivalent to table 21 described above. Table 178 is provided with a central circular aperture 179, and is secured in suitable manner to a supporting member 180, this latter being in the shape of a segment of a hollow sphere having a radius R and a center P, the center being normally located on the axis of the apparatus, although it will be obvious that the center P may be moved to the right or left of the axis as well as in front of and behind the axis. The supporting member 180 is slidably received within the upper portion 181 of a stepped cylindrical receptacle 182.

Mounted on block 28 is a member 183, the lower portion of which is a stepped cylinder. The lowermost part of member 183 is equivalent to the boss 37 of member 36, and rotatably fits within the aperture 35 of block 28. Member 183, in its function as a base, is equivalent to member 36, described above. A central threaded bore 184 is provided in the bottom of member 183, and disk 38 is secured to the bottom of member 183 by means of screw 39, so that member 183 may not be lifted out of engagement with block 28. The lower portion 185 of receptacle 182 is a hollow cylinder which surrounds member 183 and rests upon the upper surface of block 28. The lower portion 185 of receptacle 182 is secured to member 183 by means of screws 186, only one of which is shown in Fig. 10.

The mechanism for locking table 178 in any tilted or nontilted position is operated by a handle 187. The handle 187 is secured to a transverse rod 189 by means of a set screw 188, the transverse rod 189 passing through bores 190 in the lower portion 185 of receptacle 182 and through bores 191 in the arms of a yoke 192, as well as through a bore 193 provided in a block 194 rising from the lower portion of member 183. The right and left sides of block 194 are planar and parallel, and the yoke 192 fits over the block, and the arms of the yoke slidably engage the sides of the block, as shown in Fig. 10. The bores 191 are slightly larger than the bores 190 and in which the rod 188 is actually journaled, whereby the yoke may move up and down slightly notwithstanding the fact that the rod passes through its arms. A column 195 rising from yoke 192 like a shank has an upper threaded portion 196. The portion 196 of column 195 passes through aperture 197 in a locking disk 198 which is received within the supporting member 180. Nut 199 and washer 200 hold the locking disk against vertical movement relative to column 195 and yoke 192. It will be seen that the column 195 passes through a relatively large circular aperture 201 provided in supporting member 180. Secured to transverse rod 188 by set screws 202 are two cams 203. The cams engage surfaces 204 near the extremities of the arms of the yoke 192, and rotation of rod 188 by handle 187 will urge the yoke downwardly, causing locking disk 198 frictionally to engage the inner surface of supporting member 180, thereby locking the supporting member against movement relative to receptacle 182.

It should be noted that surface 205 of the upper edge of receptacle 182 which engages supporting member 180 is shaped to conform to the outer spherical surface of member 180 so that the member may freely rock within the upper portion 181 of receptacle 182 when not locked by means of cams 203. It should also be noted that the center P of the sphere of which supporting member 180 is a segment is located well above the top surface of table 178. The reason for so locating center P is to place the center of universal movement of supporting member 180 substantially on the occlusal plane having relationship to a replica of dentition mounted in a cast holder on table 178 so that the operation of tilting the replica involves no transverse or longitudinal movements thereof.

Rotary movement of table 178 about a vertical axis is accomplished in a manner similar to that described in connection with table 21; and a means for preventing rotation of table 178 is also provided, such means being those provided in the apparatus as first described, and illustrated in Fig. 9. The member 43, slidably mounted in slot 43a of block 28, may be urged by screw 48 to jam the lowermost portion of member 183 within aperture 35 of block 28 similarly as the member 43 may be used to jam boss 37 of member 36 within said aperture.

Suitable scales are provided on the exterior of supporting member 180 to indicate the amount of tilt and of rotary movement on a vertical axis. No such scales, however, are shown in the drawing. Also suitable calibrations in degrees are provided on the outer surface of the lower portion 185 of receptacle 182 for indicating the amount of rotary movement on a vertical axis of said receptacle.

With reference now to the modified upper assembly of parts of the apparatus, the single column which is substituted for the posts 15 is designated 206, and the cantilever which is substituted for cantilever 17 is designated 207. See Figs. 11 12, 14, and 15. Column 206 is a tube having oppositely disposed elongated fenestrations 208 cut in its wall, the long dimensions of the fenestrations being vertical, as shown in Fig. 12. The width of the fenestrations 208 is greater on the outside than on the inside of the tube (see Fig. 11). Mounted in any suitable manner on the inside of the wall of the tube of column 206, and toward the rear of the apparatus, is a vertically disposed rack 209. Part of the wall of the tube is broken away in Fig. 11 to show some of the teeth of the rack. The outside cylindrical surface of column 206, on which the rear portion of cantilever 207 may slide vertically, is provided with a scale 210, the scribings of the scale facing the front of the apparatus. It is convenient to read the scale against the top surface of the rear portion of cantilever 207 as an indicator.

Cantilever 207 is lockable, like cantilever 17, on its support; and extends, normally, horizontally from column 206 over the lower assembly of parts of the apparatus. Compare Figs. 12 and 15 with Fig. 3.

The rear portion of cantilever 207 comprises a base 211 which is adapted slidably to engage column 206. The base 211 is generally the functional equivalent of base 124 of cantilever 17, although it will be readily seen in the drawing that the two bases have different shapes and different structures for locking them to their respective supports. Base 211 is essentially a thickened rear end portion of cantilever 207 having a vertical bore 212 the diameter of which is slightly greater than the outside diamter of column 206. On each side of base 211 and extending from the outside of the base to the bore 212 thereof is an aperture 213 of rectangular cross section. Mounted within each aperture 213 is one of two like and oppositely disposed gibs 214. Each gib is provided with flanges 215; and screws 216 pass through said flanges and secure the gib to base 211, as best shown in Fig. 11. The fenestrations 208 of column 206 have tapered vertical sidewalls like embrasures, and the inner portions 217 of the gibs 214 are shaped slidably to mate with the sidewalls of the fenestrations. Journaled in the gibs 214 and extending transversely through column 206 is a shaft 218. One end of shaft 218 is provided with a flange 219. This flange abuts the outside of one of the gibs 214, as shown in Fig. 11. Rigidly mounted on shaft 218 is a pinion 220 which meshes with rack 209, as indicated only in Fig. 11. The pinion 220 is wholly obscured in Fig. 12. Pinion 220 is provided with a hub 221 one end of which rotatably engages one of the gibs 214. It will be seen in Fig. 11 that the flange 219 and the hub 221 prevent axial movement of the shaft 218. Rigidly mounted on that end of shaft 218 opposite flange 219 is a knurled knob 222.

If base 211 of cantilever 207 is free to slide vertically on column 206 the cantilever may be adjusted by means of knob 222, the rotation of which drives pinion 220 along rack 209.

The base 211 is slotted horizontally from side to side at 223 whereby the upper portion is partly separated from the lower portion thereof. The lower portion of the base 211 is vertically slotted at 224, forming ears 225 and 226 (Figs. 11 and 12). Due to the slots at 223 and 224 ear 225 may be sprung slightly. A screw 227 is passed freely through ears 225 and 226; and threaded on that end portion of screw 227 beyond ear 225 is a cylindrical nut 228. The nut is provided with a radially disposed rigid handle 229 by means of which the nut may be driven. Obviously the ears 225 and 226 together with screw 227 and nut 228 constitute a clamp which is used for locking the cantilever 206 in a desired vertical position on column 206. In Figs. 11 and 12 at least one of several like washers 230 is provided on screw 227 between nut 228 and ear 225, between the two ears, and between ear 226 and the head of the screw. A set screw 231, driven through ear 226, prevents rotation of screw 227.

Driven into block 14 is a vertically disposed screw 232 having a knurled head 233. The level of the top of head 233 may, of course, be varied by rotating the screw. The head 233 is provided as a detent to limit downward movement of cantilever 207. A jam nut 234 is provided for locking screw 232 against rotation.

Near its forward end portion cantilever 207 slants downwardly at 235. The forward end portion 236 of the cantilever is horizontally disposed, as best seen in Fig. 15, and supports a front cuspal guide structure 237 which is functionally equivalent to the front cuspal guide structure 79 (see above; also, Figs. 1 through 4a).

Cantilever 207 is provided with a circular aperture 238, as indicated in Fig. 16. The axis of the aperture is the vertical axis of the apparatus. Rotatably mounted within aperture 238 is a cylindrical element 239 provided with a flange 240 which prevents said element from passing upwardly through the aperture. The upper portion of element 239 is externally threaded at 241, and is provided with a coaxial truncated conical opening 242. The element 239 is coaxially bored upward from the bottom in steps, the lowermost portion of the bore being threaded at 243. The bore is carried through the element to meet the conical opening 242; and that portion 244 of the bore adjacent to said opening is shaped to accommodate the upper portion of the spheroid base 245 of an instrument holder 246. Driven into the lowermost portion of the bore of element 239 at 243 is another cylindrical element 247. The latter is provided with external threads to mesh with the threads at 243; and element 247 is provided with a coaxial truncated conical opening 248 in its lower portion, and an adjacent coaxial opening 249 which serves as a seat to accommodate the lower portion of the spheroid base 245 of the instrument holder 246. With the elements 239 and 247 engaging each other, with the spheroid base 245 therebetween, as shown in Fig. 16, the instrument holder 246 can neither be raised nor lowered, but, under certain circumstances, may be universally oscillated, the center of its spheroid base 245 being the center of oscillation.

The instrument holder 246 is best illustrated in Fig. 16. From the spheroid base 245 rises a column 250. The holder 246 is bored at 251, the bore extending coaxially through the column 250 and the spheroid base 245. At the upper end portion of the column 250 are two set screws, 252 and 253, which may be driven to intersect the bore at 251. See Figs. 14, 15, and 16. An instrument (here, a pointer), such as may be used in connection with the holder 246, is indicated in dot and dash lines in Fig. 15.

The conical opening 242 of element 239 contracts downwardly, and the conical opening 248 of element 247 contracts upwardly, as shown in Fig. 16; and, therefore, the instrument holder 246, carrying an instrument, as indicated in Fig. 15, may oscillate within limits without interference by the two elements 239 and 247.

The cantilever 207 is provided with three apertures 254, each alike, and of circular cross section, distributed at equal angular stations around the aperture 238 of the cantilever. Only one aperture 254 may be seen, and that in section in Fig. 16. Each aperture 254 has a truncated conical lower portion 255 and an upper portion 256 adapted to provide a seat for a sphere 257. While the three apertures 254 are totally obscured in Fig. 14, portions of the spheres 257 which are seated in said apertures may be seen in this figure, which adequately indicates the arrangement of the apertures 254 in cantilever 207. Each sphere 257 is bored centrally at 258 (Figs. 14, 15, and 16) to receive a rod 259. The conical lower portion of any aperture 254 permits oscillation of a rod 259, with the center of the related sphere 257 being the center of oscillation.

Mounted on the three spheres 257, as best seen in Figs. 14 and 15, is a triangular plate 260, having as a convenience, truncated apices, as shown, and three angularly spaced circular apertures 261 (see Fig. 14) in which the upper portions of the spheres 257 are received. The spheres 257, being split as shown in Fig. 14, are, in essence, collets for the rods 259. The apertures 261 are shaped to accommodate the upper portions of the spheres 257 (see Fig. 16). Mounted on the externally threaded upper portion of element 239 at 241, and above plate 260, is a circular nut 262. Ordinarily the spheres 257, captivated between the apertures 254 of cantilever 207 and the corresponding apertures 261 of plate 260, may rotate, although their centers may not move relatively to the cantilever and the plate. When, however, the plate 260 is forced downwardly upon the spheres 257, as by means of the nut 262, the spheres are not only locked against any movement relative to the cantilever and the plate, but the spheres, operating as tightened collets, jam the rods 259 against such movement also.

Mounted on the front cuspal guide structure 237 and on two lateral cuspal guide structures 263 and 264 is a cradle 265. Structures 263 and 264, like structure 237, are mounted on cantilever 207. The cradle 265 is illustrated in plan in the combination comprising Figs. 11 and 14, and in right side elevation in Fig. 15. The front cuspal guide 237 appears in Figs. 14 and 15. The lateral cuspal guides 263 and 264, which are functionally equivalent to lateral cuspal guides 81, previously described, appear in Figs. 11 and 12. The lateral cuspal guides 263 and 264 are seen in the drawing to be just forward of the column 206; and these guides are respectively on the right and left sides of the upper assembly of parts of the apparatus. The cradle 265 has, accordingly, three points of support. The body or main portion of the cradle is designated 266, and is a roughly triangular pan-like structure, normally horizontally disposed beneath the cantilever 207. From the front of the body of the cradle an arm 267 extends upwardly and forwardly at a slant, as shown in Figs. 15 and 16; but compare Fig. 14. At the front of the upper assembly of parts of the apparatus arm 267 is horizontal, this end portion of the arm being designated 268. From the rear of the body of the cradle, and on the two sides thereof, arms 269 and 270 (right and left, respectively, as referred to the apparatus) extend upwardly and rearwardly at a slant, as shown in Figs. 15 and 16; and rigidly mounted at the rear end portion 271 of each arm is a transverse horizontal rod. The rods are coaxial and extend toward each other from the end portions 271 of arms 269 and 270, as best shown in Fig. 11. The rod mounted on the rear portion of arm 269 is designated 272 and engages lateral cuspal guide 263 on the right of the apparatus; the rod mounted on the rear portion of arm 270 is designated 273 and engages lateral cuspal guide 264 on the left of the apparatus.

Provided on the upper side of the body 266 of the cradle 265 are three bosses 274, two of which are visible in Fig. 16, one of said bosses being in section in that figure. The three bosses 274 are normally in register with the apertures 254 of cantilever 207, the apertures 261 of plate 260, and the split spheres 257 (see Fig. 16). Each boss is counterbored and threaded internally to receive means 275 (shown only in Fig. 16) for rotatably captivating a spheroid 275a provided on the lower end of a rod 259. Rods 259 are universally connected to the cradle 265 like rods 135 are connected to plate 77 (cf. Fig. 4a).

Surrounding each rod 259 and bearing against the under side of cantilever 207 and the upper side of the body 266 of the cradle 265 is a compression spring 276. The springs 276 are alike. When the nut 262 is loosened and plate 260 bears with negligible force against the split spheres 257, the spheres operate as relaxed collets, and the rods 259 are free to slide within the bores at 258 of said spheres. While the cradle 265 may then be rocked, as by the hand of the operator, the cradle will normally seek the position shown in Figs. 15 and 16, due to the evenly distributed pressure of springs 276. Obviously, when the nut 262 is tightened sufficiently, the plate 260 jams the spheres 257 upon the rods 259, and the relationship between the cantilever 207 and the cradle 265 is fixed, whether the relationship be normal, as shown in the drawing, or otherwise.

Mounted on the under side of the body 266 of cradle 265 in any suitable manner is a cast holder 277 (shown only in Fig. 15), which is functionally equivalent to cast holder 18, previously described. Shown mounted on cast holder 277 in Fig. 15 is a replica of an upper set of teeth.

The front cuspal guide mounted on the front end portion 236 of cantilever 207 is generally designated 237 (see above). The cuspal guide 237, which is functionally equivalent to cuspal guide 79, previously described, comprises two vertically disposed plates 278, each of which is secured to a side of the front end portion 236 of the cantilever by screws 279; a pair of guide members 280 and 281 mounted between plates 278 for independent pivotal movement on pins 282 provided by turning down the inner ends of screws 282a driven through plates 278 and jammed by nuts 283, as shown in Fig. 14; and two pairs of cap screws for locking the guide members 280 and 281 in selected angular positions, each pair being freely passed through arcuate slots in plates 278 and threaded into the ends of one of the guide members. The cap screws for locking guide member 280 are indexed 284 (both are seen only in Fig. 14), and are passed through registered arcuate slots 285 provided in plates 278; and the cap screws for locking guide member 281 are indexed 286 (both are seen only in Fig. 14), and are passed through registered arcuate slots 287 provided in plates 278.

Threaded through the front end portion 268 of arm 267 of the cradle 265 is a screw 288, which is normally disposed vertically, as shown in Fig. 15. The lower end of screw 288 is rounded and engages both guide members 280 and 281. A knurled jam nut 289 is provided for locking screw 288. The head 290 of screw 288 is knurled and is provided with an indicator flange 291. Extending upwardly from the front end portion 268 of arm 267 is a scaled element 292, best seen in Fig. 15. This element is parallel to the axis of screw 288, and the calibrations of the element 292 may be read easily by the indicator flange 291 of head 290 of the screw. In Fig. 15 the flange 291 indicates zero on the scale of element 292, which means that the cradle is in normal position. By loosening the jam nut 289, the screw 288 may be rotated so as to move it to a new position wherein the reading of the scale of element 292 is no longer zero. Obviously, then, the cradle will not be in normal position, but the reading will serve as an index of the angular change of the cradle with respect to the cantilever 207 and to the apparatus as a whole.

The instrument holder 246 is mounted between elements 239 and 247 for universal oscillatory movement, within limits, about the center of the spheroid base 245 as the center of such movement; but means are provided for locking the holder against any movement relative to cantilever 207 when the holder is in its normal position, as illustrated in Fig. 16, and in any other available angular position relative to cantilever 207.

When the instrument holder 246 is in normal position its column 250 is disposed at right angles to the plane of cantilever 207. See Fig. 16. Figs. 17 and 18 are sections, in plan, taken on the plane indicated by the index 18—18 of Fig. 16. The spheroid base 245 of the holder 246 is provided with three depressions 293, spaced at unequal angular intervals, these angular intervals being designated, for convenience, a, b, and c, as in Fig. 18. While the angular intervals in Fig. 18 appear to be roughly 120°, they are not: the reason for selecting unequal angular intervals is to insure that the instrument holder may be locked in normal position with the set screws 252 and 253 in the relative positions shown in Figs. 14, 15 and 16. The depressions 293 are all bisected by the plane of the index 18—18 of Fig. 16 when the instrument holder is normally positioned.

The circular aperture 238 of cantilever 207 is counterbored at 294 (Fig. 16). Fitted within the counterbore at 294 is a flat key 295, which is seen in plan in Figs. 17 and 18. The key 295 comprises a main portion 296 which is of circular periphery, this portion being fenestrated and having three cams 297 extending toward the center of portion 296. Portion 296 surrounds element 239, seen in section in Figs. 17 and 18; and it will also be seen in these figures that at the level of the key 295 the element 239 is provided with three angularly spaced radial bores 298, each carrying freely therein two balls 299 and 300, the balls of each pair being in train within the related bore 298, and ball 299 being closest to base 245 of instrument holder 246. The key 295 is provided with a handle 301 by means of which the key may be rotated within the counterbore at 294. Cantilever 207 is provided with a depression 302 within which handle 301 may oscillate. See Fig. 14. Rotation of the key in a particular direction brings the cams 297 against the balls 300 and forces these balls and related balls 299 toward the center of the base 245. If the instrument holder is normally positioned when the key is so rotated, balls 299 are forced into the depressions 293 and thereby positively lock the instrument holder against movement relative to cantilever 207. See Figs. 16 and 18. Fig. 17 shows the key 295 in a nonlocking position; and, in this figure, since the depressions 293 are not seen even though the section is taken according to the index 18—18 of Fig. 16, it may be assumed that the instrument holder 246 has been oscillated out of its normal position.

The angular intervals of the depressions 293 of spheroid base 245 of instrument holder 246, of cams 297, and of the radial bores 298, are alike, all corresponding to a, b, and c (Fig. 18).

Mounted on a post 303 secured in suitable manner to the base of the apparatus is a face bow 304 and a bite plate 305, both seen in elevation in Fig. 15, with the face bow best seen in plan in Fig. 14, and the bite plate shown in plan in Fig. 19. The face bow and the bite plate are both mounted on the post for vertical movement and may be locked at selected levels thereon. Post 303 is provided with a keyway 306, and the face bow and the bite plate are each provided with suitable keys 307 engaging said keyway to prevent rotation of these members as they are moved vertically on said post. Set screws 308 and 309 are provided respectively for locking the face bow and the bite plate at selected levels.

The face bow is substantially a horse show shaped sheet disposed in a horizontal plane and is symmetrical about axis A—A as best seen in Fig. 14. The concave aspect of the face bow is directed toward the vertical axis of reference of the apparatus. On either side of the axis A—A the face bow is provided with two arcuate slots 310 and 311. Mounted on the face bow on either side of axis A—A are two like centripetally disposed pointer elements 312 and 313. Each of these elements is slotted longitudinally at 314, and lock screws 315, having squared portions operating as keys to prevent rotation with respect to the slots, are passed through the longitudinal slots as at 314 and one of the oppositely disposed arcuate slots of the face bow. Accordingly the pointer elements may be moved angularly about the two horns of the face bow, and each pointer element may be moved toward and away from the vertical axis of reference of the apparatus. Each horn of the face bow is angularly scaled, and each pointer element is longitudinally scaled, as shown in Fig. 14.

At the extremities, 316 and 317, of the face bow are parallel slots 318 and 319. The slots 318 and 319 are longitudinally scaled. Mounted on the extremities 316 and 317 are, respectively, pointer elements 320 and 321. The pointer elements 320 and 321 are each longitudinally slotted at 322 and scaled. Lock screws 323 are passed between the parallel slots 316 and 317 and the longitudinal slots of the pointer elements 320 and 321.

It will be obvious from Fig. 14 that the curvature of the dental structure in a horizontal plane may be determined by experimental movements of the pointer elements 312 and 313 about the two opposite horns of the face bow. It will also be understood that the longitudinal and lateral cranial measurements of the patient may be approximately measured by experimental movements of the pointer elements 320 and 321.

The bite plate 305 may conveniently follow the shape suggested in Fig. 19. The bite plate is provided with two circular orifices 324 and 325 each of which is bisected by the longitudinal centerline of the bite plate, as shown in the drawing, and either orifice may be positioned so that its center conforms to the vertical axis of reference of the apparatus. The bite plate is here shown to be of composite construction, and is adapted to telescope longitudinally as indicated in Fig. 15. A lock nut 326 is provided for locking the bite plate in a particular telescoped position.

I claim:

1. Dental surveying apparatus comprising a frame and two cooperating cast holders, wherein said frame comprises a base with a standard mounted thereon and a cantilever mounted on said standard for vertical movement; a first cast holder universally mounted on said base for positional change; a second cast holder universally mounted on said cantilever for positional change; and guide members mounted on said cantilever for predetermining vertical separation of said cast holders during positional change of said second cast holder.

2. Dental surveying apparatus comprising a frame and two cooperating dental cast holders, each of the latter universally mounted on said frame for positional change, and cams mounted on said frame and engaging one of said cast holders for predetermining the relationship of the two cast holders during positional change of one thereof.

3. In apparatus of the class described a frame having two cooperating dental cast holders universally mounted thereon for positional change, and means for predetermining positional change of one of said cast holders relative to the other in simulation of mastication.

4. Dental surveying apparatus comprising a frame having universally mounted thereon two oppositely disposed and cooperating cast holders, and means for selectively predetermining the paths of positional change of one of said cast holders whereby investigation of the occlusive and masticatory characteristics of dental casts held by the two holders may be made.

5. Dental surveying apparatus comprising a frame having universally mounted thereon two oppositely disposed and cooperating cast holders, and means for selectively predetermining the paths of positional change of one of said cast holders whereby investigation of the occlusive and masticatory characteristics of dental casts held by the two holders may be made, including a plurality of integral indicators of the multi-plane movements of said cast holders relative to said frame and relative to each other.

6. Dental surveying apparatus comprising a frame having universally mounted thereon for positional change two oppositely disposed and cooperating cast holders; means for selectively separating the two cast holders from each other; and means for selectively predetermining the paths of positional change of one of said cast holders whereby investigation of the occlusive and masticatory characteristics of dental casts held by the two holders may be made, said means comprising adjustable cams engaging said one of said holders and simulating cuspal contours.

7. Dental apparatus comprising a frame having a base with a standard mounted thereon and a cantilever mounted on said standard for vertical movement; a first cast holder universally mounted on said base for positional change; and a second cast holder universally mounted on said cantilever for positional change, said lastnamed cast holder connected to said cantilever by a plurality of members, each universally engaging said lastnamed cast holder, and each member slidably passed through one of a plurality of clamps mounted on said cantilever for universal movement thereon, and means for locking said clamps on said members and on said cantilever.

8. Dental apparatus comprising a frame having a base with a standard mounted thereon and a cantilever mounted on said standard for vertical movement; a first cast holder universally mounted on said base for positional change; and a second cast holder universally mounted on said cantilever for positional change, the mount of said second cast holder including a ball mounted for universal rotation on said cantilever, said ball having a plurality of circumferentially spaced pockets in one plane, a cam rotatably mounted on said cantilever, said cam engaging said pockets and locking said ball against rotation when said ball is oriented in a particular manner.

9. Apparatus comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; and another dental cast holder mounted on said base for universal movement relative thereto and to said support.

10. The combination of claim 9 wherein said support comprises a cantilever extending over said other holder and wherein said first named holder is mounted on said support for universal movement relative thereto, and including means for urging said first named holder to assume a particular relationship with respect to said support.

11. The combination of claim 9 including means on said base for mounting a face bow.

12. Apparatus comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; another dental cast holder mounted on said base for universal movement relative thereto and to said support; and means for locking said other dental cast holder in a selected position.

13. Apparatus comprising a main frame including a base; a support for a dental cast holder mounted on said main frame, said support being pivotable about a horizontal axis; a dental cast holder mounted on said support for universal movement relative thereto and to said base; means for locking said holder in a selected position; means for automatically returning said holder to particular position when unlocked; and another dental cast holder mounted on said base for universal movement relative thereto and to said support.

14. Apparatus comprising a main frame including a base; a support for a dental cast holder mounted on said main frame, said support being pivotable about a horizontal axis; a dental cast holder mounted on said support for universal movement relative thereto and to said base; means for locking said holder in a selected position; means for automatically returning said holder to a particular position when unlocked; another dental cast holder mounted on said base for universal movement relative thereto and to said support; and means for locking said other dental cast holder in a selected position.

15. Apparatus comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; another dental cast holder mounted on said base for universal movement relative thereto and to said support, said other holder having a hemispheroidal surface slidably seated within an annulus having a vertical axis, said surface carrying an index showing its angular relationship to said base.

16. Apparatus comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; another dental cast holder mounted on said base for universal movement relative thereto and to said support, said other holder having a hemispheroidal surface slidably seated within an annulus having a vertical axis, said surface carrying an index showing its angular relationship to said base; and means for locking said other dental cast holder in a selected position.

17. Apparatus comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; another dental cast holder mounted on said base for universal movement relative thereto and to said support, said other holder having a hemispheroidal surface slidably seated within an annulus having a vertical axis, said surface carrying an index showing its angular relationship to said base; and means for moving said annulus horizontally with respect to said base.

18. A dental instrument comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; another dental cast holder mounted on said base for universal movement relative thereto and to said support, said other holder having a hemispheroidal surface slidably seated within an annulus having a vertical axis, said surface carrying an index showing its angular relationship to said base; means for moving said annulus horizontally with respect to said base; and means for locking said other dental cast holder in a selected position.

19. A dental instrument comprising a main frame including a base; a support for a dental cast holder mounted on said main frame, said support being pivotable about a horizontal axis; a dental cast holder mounted on said support for universal movement thereto and to said base; means for automatically returning said holder to a particular position when released; another dental cast holder mounted on said base for universal movement relative thereto and to said support, said other holder having a hemispheroidal surface slidably seated within an annulus having a vertical axis, said surface carrying an index showing its angular relationship to said base, and means for moving said annulus horizontally with respect to said base, said annulus being rotatable about its axis.

20. A dental instrument comprising a main frame including a base; a support for a dental cast holder mounted on said main frame, said support being pivotable about a horizontal axis; a dental cast holder mounted on said support for universal movement relative thereto and to said base; means for automatically returning said holder to a particular position when released; another dental cast holder mounted on said base for universal movement relative thereto and to said support, said other holder having a hemispheroidal surface slidably seated within an annulus having a vertical axis, said surface carrying an index showing its angular relationship to said base, said annulus being rotatable about its axis; means for moving said annulus horizontally with respect to said base; and means for locking said other dental cast holder in a selected position.

21. A dental instrument comprising a main frame including a base; a support for a dental cast holder mounted on said main frame, said support being pivotable about a horizontal axis; means for locking said support against pivotal movement about said axis; a dental cast holder mounted on said support for universal movement relative thereto and to said base; means for automatically returning said holder to a particular position when released; and another dental cast holder mounted on said base for universal movement relative thereto and to said support.

22. The combination of claim 21 including means for locking said first named holder in a selected position.

23. A dental instrument comprising a main frame and including a base; a support for a dental cast holder, said support being mounted on a column for vertical movement relative thereto, and said column being pivotable about a horizontal axis; a dental cast holder mounted on said support for universal movement relative thereto and to said base; means for automatically returning said holder to a particular position when released; and another dental cast holder mounted on said base for universal movement relative thereto and to said support.

24. The combination of claim 23 including means for locking said column against pivotal movement.

25. Dental surveying apparatus comprising a frame and two cooperating cast holders universally mounted thereon for positional change, wherein one of said cast holders is mounted on a support comprising a cantilever extending over the other said holder and wherein said one cast holder is mounted on said support for universal movement relative thereto, and including means for urging said one cast holder to assume a particular relationship with respect to said support; and adjustable means cooperating between said support and said holder for predetermining said particular relationship.

26. Dental surveying apparatus comprising a frame and two cooperating cast holders universally mounted thereon for change relative to each other, said frame including a cradle mounted for universal movement relative to other portions of said frame, with one of said cast holders mounted on said cradle.

References Cited in the file of this patent

UNITED STATES PATENTS

| | | |
|---|---|---|
| 2,534,023 | Hirschhorn | Dec. 12, 1950 |
| 2,535,146 | Lyons | Dec. 26, 1950 |
| 2,613,440 | Murray et al. | Oct. 14, 1952 |
| 2,621,407 | Schlesinger | Dec. 16, 1952 |